United States Patent
Yamamoto et al.

(10) Patent No.: US 12,422,923 B2
(45) Date of Patent: Sep. 23, 2025

(54) CONTENT SHARING SYSTEM WITH A PLURALITY OF USERS IN AUGMENTED REALITY

(71) Applicant: NTT DOCOMO, INC., Tokyo (JP)

(72) Inventors: Taishi Yamamoto, Chiyoda-ku (JP); Eriko Oseki, Chiyoda-ku (JP); Kouki Hayashi, Chiyoda-ku (JP); Osamu Goto, Chiyoda-ku (JP); Mikio Iwamura, Chiyoda-ku (JP); Shinji Kimura, Chiyoda-ku (JP); Masayuki Yokoo, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/292,234

(22) PCT Filed: Jul. 20, 2022

(86) PCT No.: PCT/JP2022/028189
§ 371 (c)(1),
(2) Date: Jan. 25, 2024

(87) PCT Pub. No.: WO2023/008277
PCT Pub. Date: Feb. 2, 2023

(65) Prior Publication Data
US 2025/0093949 A1   Mar. 20, 2025

(30) Foreign Application Priority Data
Jul. 26, 2021 (JP) ................... 2021-121389

(51) Int. Cl.
*G06F 3/01* (2006.01)
*G06V 20/20* (2022.01)

(52) U.S. Cl.
CPC .............. *G06F 3/013* (2013.01); *G06V 20/20* (2022.01)

(58) Field of Classification Search
CPC ..................................................... G06F 3/013
(Continued)

(56) References Cited

U.S. PATENT DOCUMENTS

| 2018/0107835 A1* | 4/2018 | Clement ............ A63F 13/212 |
| 2021/0272373 A1* | 9/2021 | Fradet ................ G06F 3/04815 |

FOREIGN PATENT DOCUMENTS

JP   2018-158120 A   10/2018

OTHER PUBLICATIONS

International Search Report mailed on Sep. 20, 2022 in PCT/JP2022/028189 filed on Jul. 20, 2022, 2 pages.
(Continued)

*Primary Examiner* — Long D Pham
(74) *Attorney, Agent, or Firm* — Oblon, McClelland, Maier &Neustadt, L.L.P.

(57) ABSTRACT

An AR system includes an acquisition unit configured to acquire a user state, an identification unit configured to identify gazed content which is content at which a content sharing source user is gazing, a first decision unit configured to decide whether or not to share the gazed content with other users, a second decision unit configured to identify a content sharing destination candidate user having a strong relationship with the content sharing source user on the basis of user states of the content sharing source user and one or more content sharing destination candidate users when the gazed content is shared with the other users and decide on the identified content sharing destination candidate user as a content sharing destination user, and a sharing unit configured to share the gazed content with the content sharing destination user.

4 Claims, 5 Drawing Sheets

(58) Field of Classification Search
USPC .......................................................... 345/156
See application file for complete search history.

(56) References Cited

OTHER PUBLICATIONS

International Preliminary Report on Patentability and Written Opinion issued Feb. 8, 2024 in PCT/JP2022/028189, 6 pages.

* cited by examiner

CONTENT SHARING SYSTEM WITH A PLURALITY OF USERS IN AUGMENTED REALITY

TECHNICAL FIELD

An aspect of the present invention relates to a content sharing system.

BACKGROUND ART

In Patent Literature 1, technology for displaying augmented reality (AR) content that is a specific image in a virtual space in accordance with a position of a user terminal is disclosed. According to this technology, various types of content are placed in a real space, and these types of content can be shared between all people in the place.

CITATION LIST

Patent Literature

[Patent Literature 1] Japanese Unexamined Patent Publication No. 2018-158120

SUMMARY OF INVENTION

Technical Problem

Here, the above-described content may be desired to be shared only within a specific group. For example, there are a case where AR chat is desired to be shared only between friends, a case where AR information is desired to be shared only between store staff members, and the like. However, conventionally, it is difficult to implement a process of sharing content only within a specific group intended by a user in an easy method.

An aspect of the present invention has been made in view of the above circumstances and an objective of the present invention is to easily share content only within a specific group intended by a user.

Solution to Problem

According to an aspect of the present invention, there is provided a content sharing system including: an acquisition unit configured to acquire a user state including at least a visual line direction and position information for each of a plurality of users including a first user who is a user of a content sharing source and one or more second users who are users of content sharing candidates; an identification unit configured to identify gazed content which is content at which the first user is gazing on the basis of the user state of the first user acquired by the acquisition unit; a first decision unit configured to decide whether or not to share the gazed content with other users on the basis of at least one of information of the gazed content and the user state of the first user; a second decision unit configured to identify a second user having a strong relationship with the first user on the basis of user states of the first user and the one or more second users when the gazed content is shared with the other users and decide on the identified second user as a content sharing destination user; and a sharing unit configured to share the gazed content with the content sharing destination user.

According to the aspect of the present invention, the content sharing system identifies the gazed content, which is the content at which the first user is gazing, on the basis of a visual line direction and position information of the first user who is the content sharing source user, decides whether or not the gazed content is shared with the other users on the basis of at least one of the gazed content and a state of the first user, decides on the content sharing destination user who is the second user having a strong relationship with the first user on the basis of the user states of the first user and the second user, and causes the gazed content to be shared with the content sharing destination user. In this configuration, first, because the content at which the first user is gazing is sharing target content, it is possible to appropriately designate content that is likely to be intentionally shared by the first user as the sharing target content. Also, because information of the gazed content and the state of the first user are taken into account to decide whether or not to share the gazed content instead of sharing all gazed content, for example, a process of excluding content considered not to be desired to be shared with the first user from the sharing target content or stopping sharing the content when it is assumed that the situation is not a situation in which the content is shared from the situation of the first user, or the like is possible. Also, because the second user having the strong relationship with the first user becomes the content sharing destination user in consideration of the user state (a visual line direction, position information, and the like) of the first user and the second user, the content can be appropriately shared with the user who is assumed to be in the same group as the first user (a specific group intended by the first user). According to such a content sharing system, because a process of choosing the content to be shared, a process of deciding whether or not to share it, and a process of choosing a sharing destination (a process of choosing a user of a specific group intended by the user) can be performed automatically, it is possible to easily share content only within the specific group intended by the user.

Advantageous Effects of Invention

According to one aspect of the present invention, content can be easily shared only within a specific group intended by a user.

DESCRIPTION OF EMBODIMENTS

Hereinafter, embodiments of the present invention will be described in detail with reference to the accompanying drawings. In the description of the drawings, the same reference signs are used for the same or equivalent elements, and redundant description thereof will be omitted.

Figure 1:
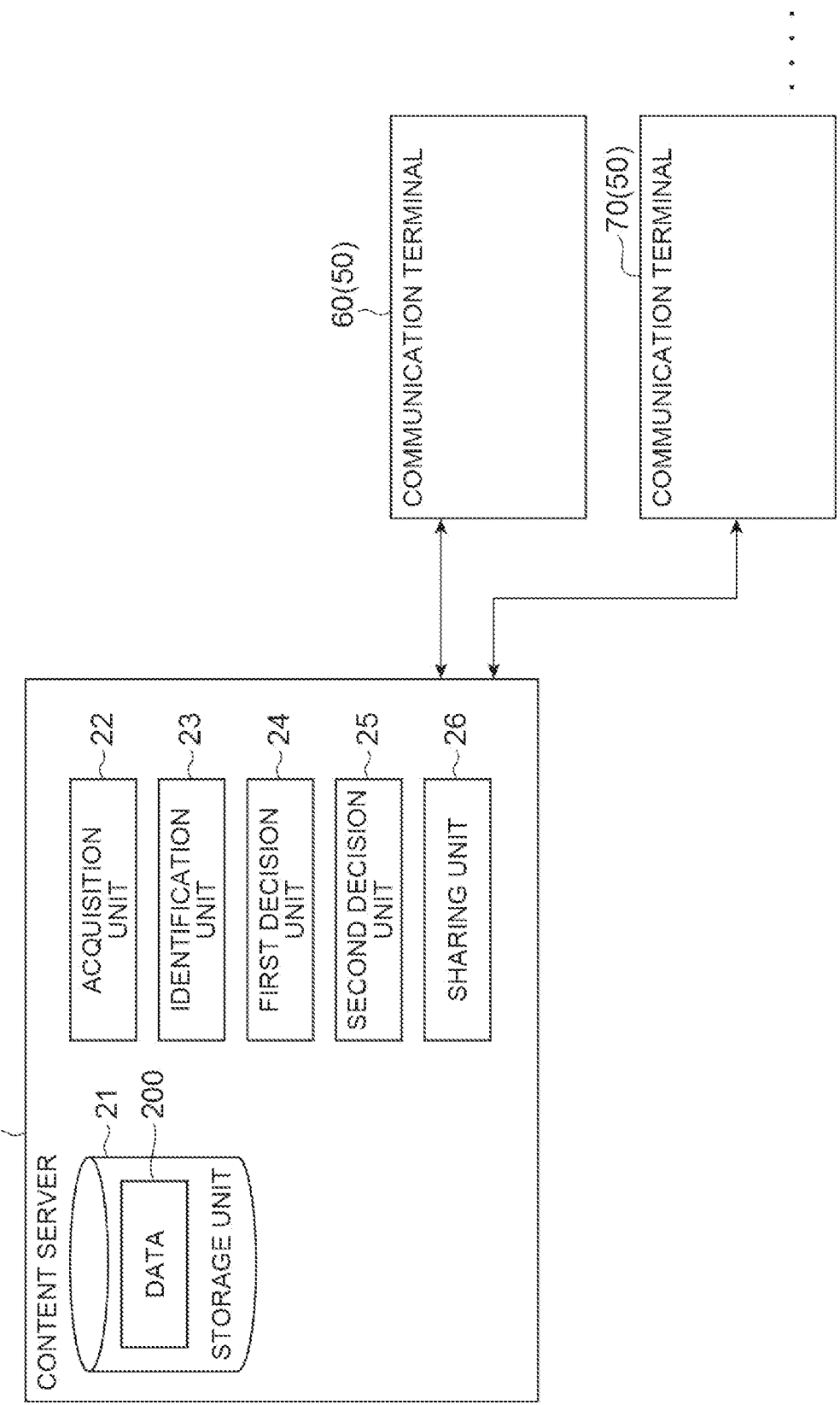
FIG. 1 is a block diagram showing a functional configuration of an AR system according to the present embodiment.

FIG. 1 is a diagram for describing an outline of an augmented reality (AR) system 1 (content sharing system) according to the present embodiment. The AR system 1 includes a content server 20 and a plurality of communication terminals 50. The AR system 1 shown in FIG. 1 is a system that displays AR content on the communication terminal 50 held by a user. The AR system 1 may be a system that displays AR content on the communication terminal 50 in accordance with an operation (a user instruction) on the communication terminal 50 by the user or may be a system that displays AR content on the communication terminal 50 in accordance with a position of the communication terminal 50.

The behavior of a case where the AR system 1 displays the AR content according to the position of the communication terminal 50 is as follows. Image data obtained in an imaging process of the communication terminal 50 is transmitted to a positioning server (not shown). The positioning server (not shown) acquires global position information on the basis of the image data obtained in the imaging process of the communication terminal 50 and transmits the global position information to the communication terminal 50. The global position information is position information (absolute position information) indicated by a common coordinate system that can be used by any device and may include position, direction, and inclination information. Also, the communication terminal 50 acquires a position of the communication terminal 50 (its own camera for obtaining the image data in the imaging process in detail) or the like by acquiring the global position information from the positioning server (not shown). Also, the communication terminal 50 transmits the acquired global position information to the content server 20. The content server 20 acquires AR content corresponding to the global position information and transmits the AR content corresponding to the global position information to the communication terminal 50. In this way, AR content corresponding to the position of the communication terminal 50 is displayed on the communication terminal 50. As described above, in the AR system 1, the AR content may be displayed in accordance with the position of the communication terminal 50 or the AR content may be displayed in accordance with an operation on the communication terminal 50 by the user.

Hereinafter, in the AR system 1, a mode in which the AR content is shared between two or more communication terminals 50 included in the AR system 1 (i.e., a mode in which the AR system 1 is a content sharing system) will be described. Hereinafter, a communication terminal 50 of a content sharing source user (a first user) may be referred to as a communication terminal 60 and a communication terminal 50 of a content sharing destination candidate user (a second user) may be referred to as a communication terminal 70. It is assumed that there are at least two or more communication terminals 70.

The communication terminals 60 and 70 are terminals that are configured to perform wireless communication and are able to display at least content. The communication terminals 60 and 70 are, for example, goggle-type wearable devices, smartphones, tablet terminals, PCs, or the like. Hereinafter, the communication terminals 60 and 70 will be described as goggle-type wearable devices.

The communication terminals 60 and 70 have the same function as each other and can be the communication terminals 60 and 70 in accordance with a situation (i.e., they can be the communication terminal 50 of the content sharing source user and the communication terminal 50 of the content sharing destination candidate user). The communication terminals 60 and 70 have at least an imaging function, a self-position estimation function, and a visual recognition direction estimation function as their functions. The communication terminals 60 and 70 transmit a user state including information acquired in their functions to the content server 20.

The imaging function is a function of imaging the surroundings by controlling the mounted camera. The communication terminals 60 and 70 continuously execute imaging, for example, when an application related to AR content is executed. The self-position estimation function is a function of estimating where the terminal itself is currently located, and can be implemented by, for example, technology such as simultaneous localization and mapping (SLAM). The SLAM is technology using cameras, various types of sensors, encoders, and the like to perform the self-position estimation and the creation of an environmental map in parallel. As a specific example of the SLAM, visual SLAM using images captured by a camera can be mentioned.

Figure 2:
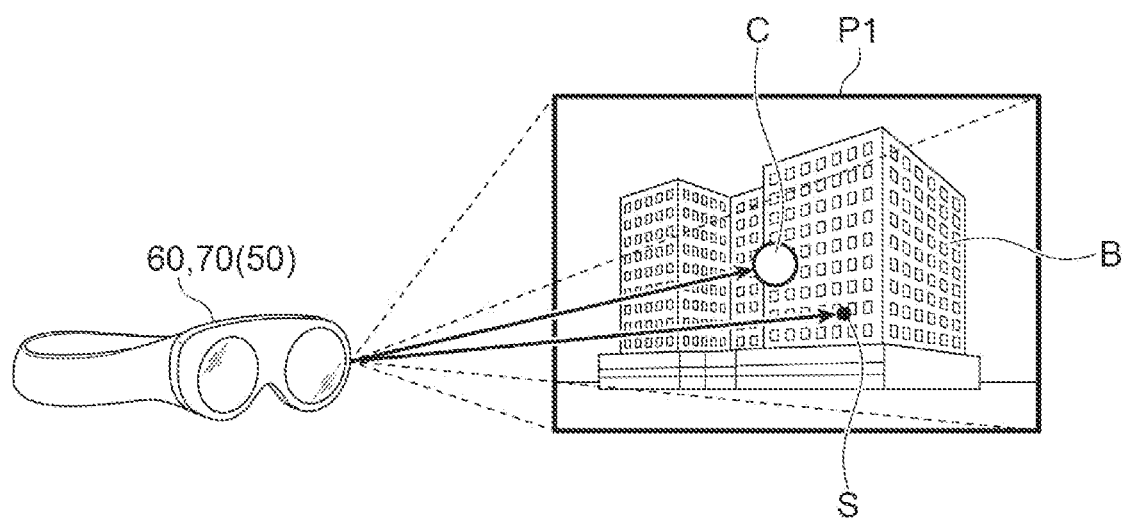
FIG. 2 is a diagram for describing a method of estimating a visual recognition direction of a user.

The visual recognition direction estimation function is a function of estimating the visual recognition direction of a user (a user wearing a wearable device). Visual recognition direction estimation methods include, for example, the following three estimation methods. Hereinafter, the three estimation methods will be described with reference to the examples shown in FIG. 2. The communication terminals 60 and 70 (50) shown in FIG. 2 are goggle-type wearable devices and are attached to a user. The user visually recognizes an area near the right center of a building B in a real space.

A first estimation method is a method based on an area of a captured image captured in the imaging function. Specifically, a direction from the position of the user to the area of the captured image is estimated as a visual recognition direction. In the example shown in FIG. 3, a direction from a position of the user to an area of an image P1 (an area near the center in front of the building B) is estimated as the visual recognition direction. That is, the user's visual recognition direction in the first estimation method is estimated on the assumption that the user captures the entire area of the captured image instead of a narrow point-shaped region.

A second estimation method is a method based on an optical center region, which is an area corresponding to the optical center of the captured image captured in the imaging function. Specifically, a direction from the user's position to the optical center region is estimated as the visual recognition direction. In the example shown in FIG. 3, a direction from the position of the user to an optical center region C of the image P1 is estimated as the visual recognition direction.

A third estimation method is a method based on an area corresponding to a gaze point of the user. When the communication terminals 60 and 70 (50) are, for example, goggle-type wearable devices or the like and are configured to be able to acquire visual line information of the user, it is possible to identify the gaze point of the user. In this case, a direction from the position of the user to the gaze point of the user is estimated as the visual recognition direction. In the example shown in FIG. 3, a direction from the position of the user to a gaze point S of the user is estimated as the visual recognition direction.

Returning to FIG. 1, the content server 20 includes a storage unit 21, an acquisition unit 22, an identification unit 23, a first decision unit 24, a second decision unit 25, and a sharing unit 26 as functional components.

The storage unit 21 stores data 200 including a plurality of items of AR content. Also, when a display position (global position information) of the AR content is fixed, the AR content and the global position information are associated in the data 200. In the communication terminals 60 and 70, the AR content included in the data 200 is displayed. Currently, it is assumed that at least one or more items of the AR content are displayed in the communication terminal 60.

The acquisition unit 22 acquires a user state including at least the visual line direction and the position information for each of the content sharing source user (the first user) and the plurality of content sharing destination candidate users (second users). Specifically, the acquisition unit 22 acquires the user state of the content sharing source user including the captured image, the self-position estimation result, and the visual recognition direction estimation result from the communication terminal 60. Likewise, the acquisition unit 22 acquires the user state of the content sharing destination candidate user including a captured image, a self-position estimation result, and a visual recognition direction estimation result from a plurality of communication terminals 70. The acquisition unit 22 acquires the user states from the communication terminals 60 and 70, for example, at a certain interval.

The identification unit 23 identifies gazed content, which is content at which the content sharing source user is gazing, on the basis of the user state of the content sharing source user acquired by the acquisition unit 22. It can be said that this gazed content is content of interest of the content sharing source user at a current point of time and is likely to be intentionally shared by the content sharing source user. The identification unit 23 may identify the gazed content from the captured image and the visual recognition direction estimation result, identify the gazed content from the self-position estimation result and the visual recognition direction estimation result when the display position (global position information) of the AR content is known, or identify the gazed content from the captured image, the self-position estimation result, and the visual recognition estimation result. Although the gazed content will be described as AR content in the present embodiment, the gazed content may be a real physical object instead of AR content.

The first decision unit 24 decides whether or not to share the gazed content with other users on the basis of at least one of the information of gazed content and the user state of the content sharing source user. By considering the information of the gazed content, for example, a process of excluding content (for example, content including private information or the like) clearly undesired to be shared by the content sharing source user from sharing targets or the like is possible. Also, by taking into account the user state of the content sharing source user, for example, it is possible to avoid sharing gazed content with other users in a case where there is a timing when the content sharing source user does not clearly desire to share content from a location (such as a company, a home, or the like) where the content sharing source user is located and the like. Also, examples of gazed content shared with other users include, for example, content related to AR chat between friends, content related to AR information shared between store staff members, and the like.

When it is decided to share the gazed content with other users, the first decision unit 24 may transmit a decision result to the communication terminal 60 of the content sharing source user and may receive an input regarding whether or not to share it from the content sharing source user. In this case, the gazed content is shared with other users only if the content sharing source user allows sharing.

When the first decision unit 24 has decided to share the gazed content with other users, the second decision unit 25 identifies one or more sharing destination candidate users having a strong relationship with the content sharing source user on the basis of user states of the content sharing source user and the plurality of content sharing destination candidate users and decides on the identified sharing destination candidate user as the content sharing destination user. A user with a strong relationship is a user in the same group who is at least in the same space as the content sharing source user. Specifically, companions (friends, lovers, and family) and third parties (clerks and facility staff members) at the time of going out, cohabitants in the home, visitors (friends and lovers), temporary visitors (salesmen and delivery people), and the like can be users who have a strong relationship with the content sharing source user.

The second decision unit 25 may designate a sharing destination candidate user whose visual field overlaps that of the content sharing source user and whose distance from the first user is less than a predetermined threshold value as the "user having the strong relationship" and decide on the "user having the strong relationship" as the content sharing destination user. The second decision unit 25 can make the above-described decision on the basis of visual recognition direction estimation results and self-position estimation results for the content sharing source user and each content sharing destination candidate user. This decision process is based on the idea that "users whose visual lines overlap and who have a short distance therebetween are likely to be having conversations with each other." Also, the second decision unit 25 may determine whether or not the users are having conversations with each other on the basis of whether or not the visual line is focused on the other party's face.

Figure 3:
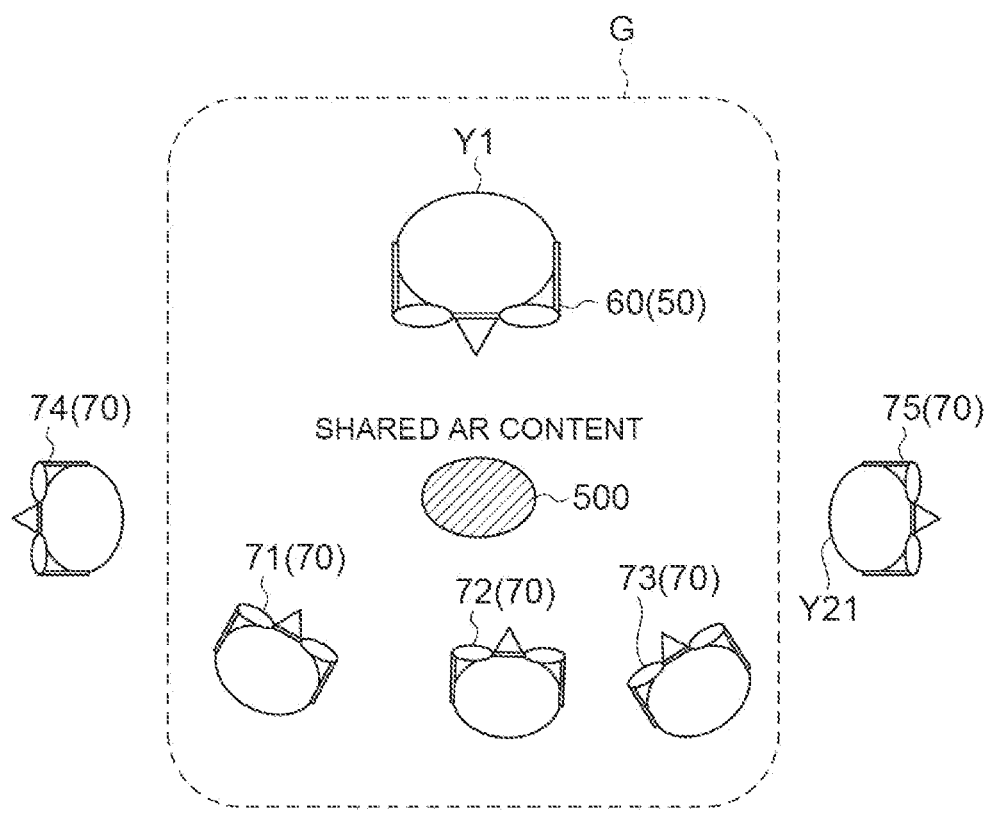
FIG. 3 is a diagram for describing an example in which the user is determined to be a sharing destination user and an example in which the user is determined not to be a sharing destination user.

FIG. 3 is a diagram for describing an example in which a user is determined to be/not to be the sharing destination user in the above-described decision process. As shown in FIG. 3, it is assumed that the AR content 500 is displayed on the communication terminal 60 of a content sharing source user Y1. Also, it is assumed that communication terminals 71 to 75 are located as communication terminals 70 of content sharing destination candidate users. Now, from a self-position recognition result of each user, it is assumed that any of the communication terminals 71 to 75 is located at a position close to the communication terminal 60 (it is assumed that the separation distance is less than a predetermined threshold value). In this case, considering a visual recognition direction estimation result of each user, content sharing destination candidate users of the communication terminals 71 to 73 are determined to be content sharing destination users because their visual fields overlap that of the content sharing source user Y1. That is, the content sharing source user Y1 and the content sharing destination candidate users of the communication terminals 71 to 73 are paired (grouped) in the same group G. On the other hand, the content sharing destination candidate users of the communication terminals 74 and 75 are not considered to be the content sharing destination users because their visual fields do not overlap that of the content sharing source user Y1. Thus, by considering the visual recognition direction (orientation), users related to the same group can be paired with higher accuracy than in a process of pairing from simple position estimation using the GPS or the like.

The second decision unit 25 identifies flow lines of the content sharing source user and the plurality of content sharing destination candidate users on the basis of a time-series change in the position information indicated in the user state and decides on a content sharing destination candidate user whose flow line matches that of the content sharing source user as the content sharing destination user.

The second decision unit 25 identifies a content sharing destination candidate user whose flow line matches that of the content sharing source user from, for example, a change in position information for about the last few minutes, and decides on the user as the content sharing destination user. This decision process is based on the idea that "users whose flow lines coincide with each other are likely to be moving together."

In a situation where the gazed content is shared with an existing content sharing destination user by the sharing unit 26 to be described below, the second decision unit 25 further decides on the content sharing destination candidate user as the content sharing destination user when there is a common content sharing destination candidate user in the visual line directions of the content sharing destination user and the content sharing source user. This decision process is based on the idea that "users who are located in visual line directions of both the content sharing destination user and the content sharing source user are likely to be in the same group."

When the content sharing destination user is determined, the second decision unit 25 may transmit information indicating the content sharing destination user to the communication terminal 60 of the content sharing source user and receive an input regarding whether or not to share it from the content sharing source user. In this case, the gazed content is shared to the content sharing destination user only when the content sharing source user allows sharing.

The sharing unit 26 shares the gazed content with the content sharing destination user decided on by the second decision unit. The sharing unit 26 identifies the gazed content from the data 200 and transmits the gazed content to the content sharing destination user. Thereby, it is possible to display the gazed content in the content sharing user. Also, the sharing unit 26 may end (delete) the sharing of the shared gazed content on the basis of an instruction from the content sharing source user or the content sharing destination user or when a certain period of time has elapsed.

Figure 4:
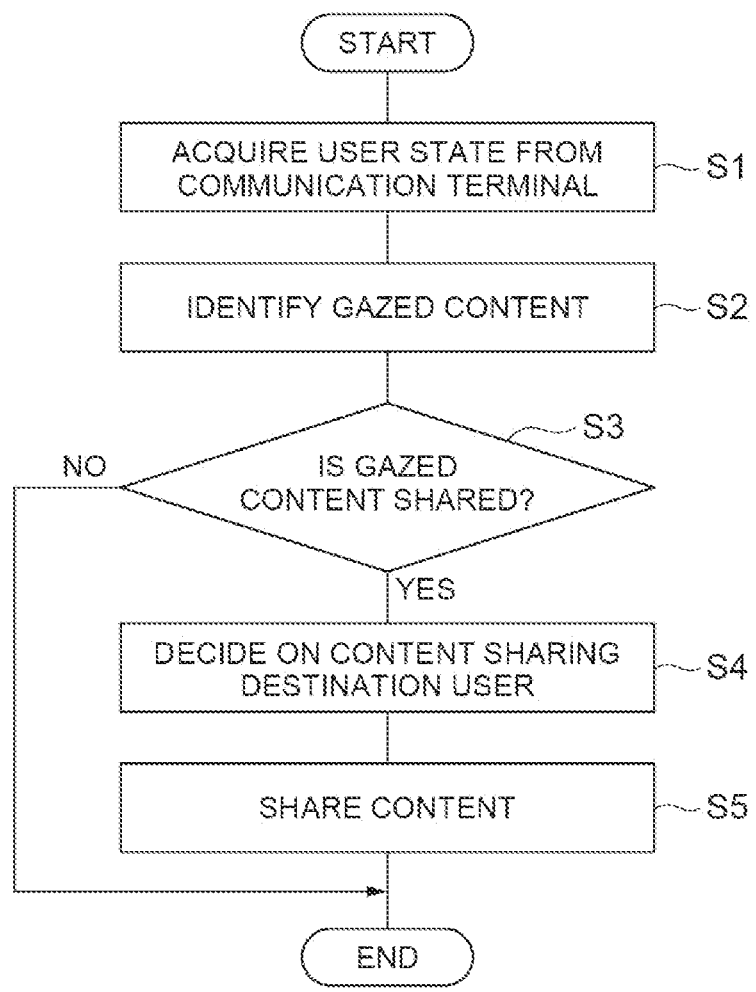
FIG. 4 is a flowchart showing a content sharing process.

Next, the content sharing process according to the present embodiment will be described with reference to FIG. 4. FIG. 4 is a flowchart showing the content sharing process.

As shown in FIG. 4, first, a user state of the content sharing source user is acquired from the communication terminal 60 and user states of the plurality of content sharing destination candidate users are acquired from the plurality of communication terminals 70 (step S1).

Subsequently, gazed content, which is content at which the content sharing source user is gazing, is identified on the basis of the acquired user state of the content sharing source user (step S2).

Subsequently, it is determined whether or not to share the gazed content with other users on the basis of at least one of the information of the gazed content and the user state of the content sharing source user (step S3). When it is determined not to share it in step S3, the process ends.

When it is determined that the gazed content is shared with other users in step S3, a content sharing destination candidate user having a strong relationship with the content sharing source user is identified on the basis of the user states of the content sharing source user and the plurality of content sharing destination candidate users and the identified content sharing destination candidate user is decided on as the content sharing destination user (steps S4).

Finally, the gazed content is shared with the content sharing destination user (step S5). The above is a content sharing process.

Next, the action effect of the AR system 1 according to the present embodiment will be described.

The AR system 1 of the present embodiment includes the acquisition unit 22 configured to acquire a user state including at least a visual line direction and position information for each of a plurality of users including a content sharing source user who is a user of a content sharing source and one or more content sharing destination candidate users who are users of content sharing candidates; the identification unit 23 configured to identify gazed content which is content at which the content sharing source user is gazing on the basis of the user state of the content sharing source user acquired by the acquisition unit 22; the first decision unit 24 configured to decide whether or not to share the gazed content with other users on the basis of at least one of information of the gazed content and the user state of the content sharing source user; the second decision unit 25 configured to identify the content sharing destination candidate user having a strong relationship with the content sharing source user on the basis of user states of the content sharing source user and the one or more content sharing destination candidate users when the gazed content is shared with the other users and decide on the identified content sharing destination candidate user as a content sharing destination user; and the sharing unit 26 configured to share the gazed content with the content sharing destination user.

According to the aspect of the present invention, the AR system 1 identifies the gazed content, which is the content at which the content sharing source user is gazing, on the basis of a visual line direction and position information of the content sharing source user, decides whether or not the gazed content is shared with the other users on the basis of at least one of information of the gazed content and a state of the content sharing source user, decides on the content sharing destination user who is the content sharing destination candidate user having a strong relationship with the content sharing source user on the basis of the user states of the content sharing source user and the content sharing destination candidate user, and causes the gazed content to be shared with the content sharing destination user. In this configuration, first, because the content at which the content sharing source user is gazing is sharing target content, it is possible to appropriately designate content that is likely to be intentionally shared by the content sharing source user as the sharing target content. Also, because information of the gazed content and the state of the content sharing source user are taken into account to decide whether or not to share the gazed content instead of sharing all gazed content, for example, a process of excluding content considered not to be desired to be shared with the content sharing source user from the sharing target content or stopping sharing the content when it is assumed that the situation is not a situation in which the content is shared from the situation of the content sharing source user, or the like is possible. Also, because the content sharing destination candidate user having the strong relationship with the content sharing source user becomes the content sharing destination user in consideration of the user state (a visual line direction, position information, and the like) of the content sharing source user and the content sharing destination candidate user, the content can be appropriately shared with the user who is assumed to be in the same group as the content sharing source user (a specific group intended by the content sharing source user). According to this AR system 1, because a process of choosing the content to be shared, a process of deciding whether or not to share it, and a process of choosing a sharing destination (a process of choosing a user of a specific group intended by the content sharing source user) can be performed automatically, it is possible to easily share content only within the specific group intended by the content sharing source user. Also, as described above, because not all of the gazed content is shared, but only appropriate content is shared (content, which does not need to be shared, is not shared), the communication load related to content sharing can be reduced.

The second decision unit 25 decides on the content sharing destination candidate user whose visual field overlaps that of the content sharing source user and whose distance from the content sharing source user is less than a predetermined threshold value as the content sharing destination user. This content sharing destination candidate user is likely to be having conversations with the content sharing source user and is likely to be in the same group as the content sharing source user. Thus, by deciding on such a content sharing destination candidate user as the content sharing destination user, it is possible to appropriately share content with a user who is assumed to be in the same group as the content sharing source user (a specific group intended by the content sharing source user).

The second decision unit 25 identifies flow lines of the content sharing source user and the one or more content sharing destination candidate users on the basis of a time-series change in position information indicated in the user state and decides on the content sharing destination candidate user whose flow line matches that of the content sharing source user as the content sharing destination user. A content sharing destination candidate user whose flow line matches that of the content sharing source user is likely to be moving with the content sharing source user and is likely to be in the same group as the content sharing source user. Therefore, by determining such a content sharing destination candidate user as the content sharing destination user, it is possible to appropriately share content with a user who is assumed to be in the same group as the content sharing source user (a specific group intended by the content sharing source user).

The second decision unit 25 further decides on the content sharing destination candidate user as the content sharing destination user when the same content sharing destination candidate user is located in visual line directions of the content sharing destination user and the content sharing source user in a situation in which the gazed content is shared with the content sharing destination user by the sharing unit 26. When there is a common content sharing destination candidate user in the visual line directions of the content sharing destination user and the content sharing source user, the content sharing destination candidate user is likely to be in the same group as the content sharing source user and the content sharing destination user with which the content has already been shared. Therefore, by further adding such a content sharing destination candidate user as the content sharing destination user, it is possible to appropriately share content with a user who is assumed to be in the same group as the content sharing source user (a specific group intended by the content sharing source user).

Figure 5:
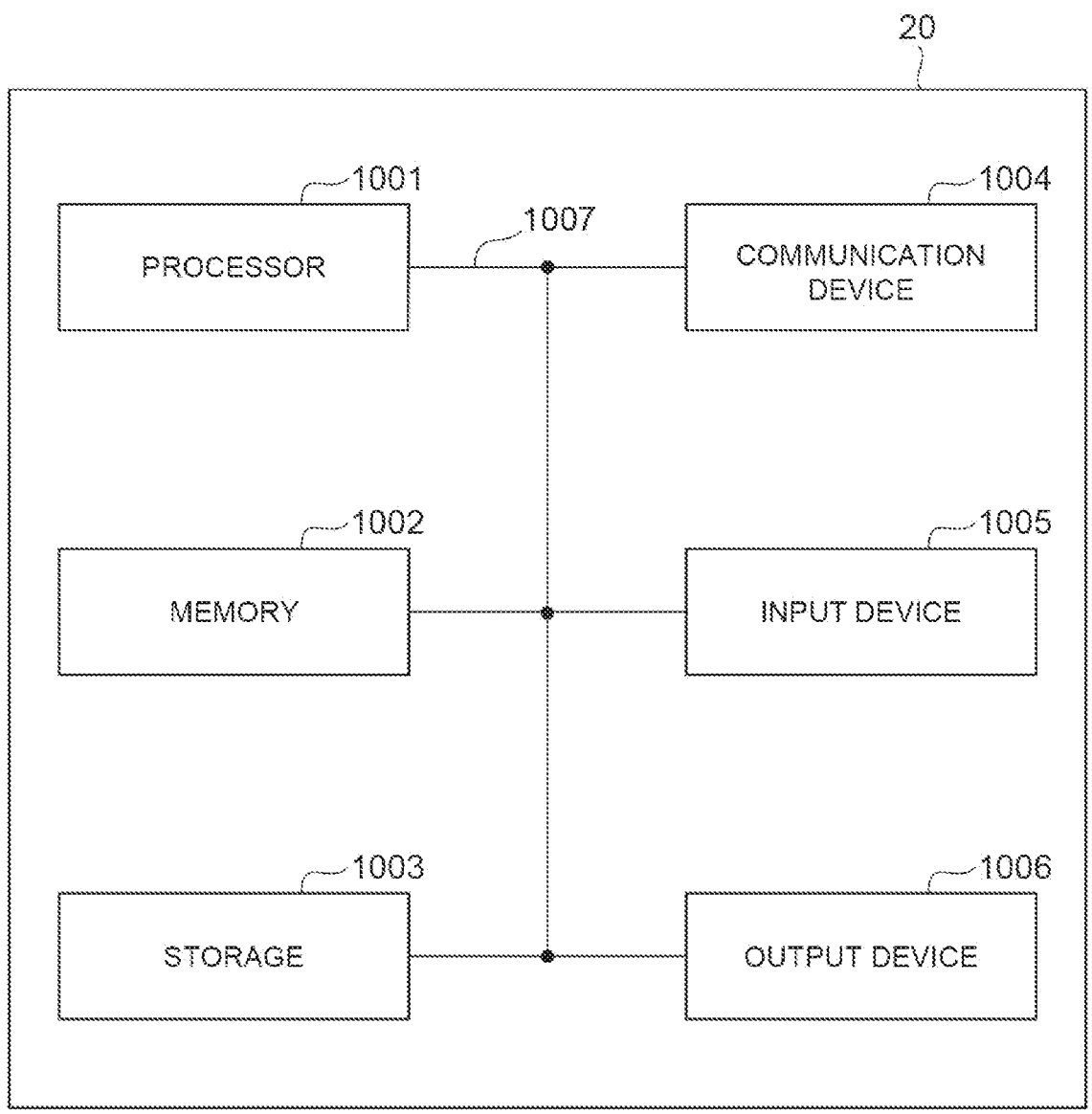
FIG. 5 is a diagram showing a hardware configuration of each device included in an AR system according to the present embodiment.

Finally, a hardware configuration of the content server 20 included in the AR system 1 will be described with reference to FIG. 5. The content server 20 described above may be physically configured as a computer device including a processor 1001, a memory 1002, a storage 1003, a communication device 1004, an input device 1005, an output device 1006, a bus 1007, and the like.

Also, in the following description, the term "device" can be read as a circuit, a device, a unit, or the like. The hardware configuration of the content server 20 may be configured to include one or more of the devices shown in FIG. 1, or may be configured without some devices.

Each function in the content server 20 is implemented by causing the processor 1001 to read a predetermined software (program) on hardware such as the processor 101 and the memory 1002, to perform the arithmetic operation by the processor 1001, to control communication by the communication device 1004, or to control reading and/or writing data in the memory 1002 and the storage 1003.

The processor 1001, for example, operates an operating system to control the entire computer. The processor 1001 may include a central processing unit (CPU) including interfaces with peripheral devices, control devices, arithmetic devices, registers, and the like. For example, a control function of the second decision unit 25 or the like of the content server 20 may be implemented by the processor 1001.

Moreover, the processor 1001 reads programs (program codes), software modules, and data from the storage 1003 and/or the communication device 1004 to the memory 1002, and performs various types of processes in accordance therewith. For the program, a program that causes a computer to execute at least a portion of the operation described in the above-described embodiments is used. For example, a control function of the second decision unit 25 or the like of the content server 20 may be stored in the memory 1002 and implemented by a control program operating in the processor 1001 and other functional blocks may be similarly implemented. While the various types of processes described above have been described as being executed by one processor 1001, they may be executed simultaneously or sequentially by two or more processors 1001. The processor 1001 may be implemented by one or more chips. Also, the program may be transmitted from the network via a telecommunications circuit.

The memory 1002 is a computer-readable recording medium, and may include at least one of a read only memory (ROM), an erasable programmable ROM (EPROM), an electrically erasable programmable ROM (EEPROM), and a random-access memory (RAM), for example. The memory 1002 may also be referred to as a register, a cache, a main memory (a main storage device), or the like. The memory 1002 is capable of storing the above-described programs (program codes), software modules, and the like capable of being executed to perform a wireless communication method according to an embodiment of the present invention.

The storage 1003 is a computer readable storage medium. The storage 1003 may include, for example, at least one of an optical disc, such as a compact disc ROM (CD-ROM), a hard disk drive, a flexible disk; an optical magnetic disk (e.g., a compact disc, a digital versatile disc, or a Blu-ray (registered trademark) disc), a smart card; a flash memory (e.g., a card, a stick, or a key drive), a floppy (registered trademark) disc, a magnetic strip, or the like. The storage 1003 may be referred to as an auxiliary memory device. The storage medium described above may be, for example, a database, a server, or other suitable medium including at least one of the memory 1002 and/or the storage 1003, or the like.

The communication device 1004 is hardware (a transceiver device) for performing communication between computers via a wired network and/or a wireless network. The communication device 1004 is also referred to, for example, as a network device, a network control unit, a network card, a communication module, or the like.

The input device 1005 is an input device (e.g., a keyboard, a mouse, a microphone, a switch, a button, a sensor, or the like) that receives an external input. The output device 1006 is an output device (e.g., a display, a speaker, an LED lamp, or the like) that externally provides an output. The input device 1005 and the output device 1006 may have an integrated configuration (e.g., a touch panel).

Moreover, devices such as the processor 1001 and the memory 1002 are connected by the bus 1007 for communicating information. The bus 1007 may be configured using a single bus or may be configured using different buses between the devices.

Also, the content server 20 may include hardware such as a microprocessor, a digital signal processor (DSP), an application specific integrated circuit (ASIC), a programmable logic device (PLD), and a field programmable gate array (FPGA), and some or all functional blocks may be implemented by the hardware. For example, the processor 1001 may be implemented by at least one of the above-described pieces of hardware.

Although the present embodiments have been described in detail, it is obvious for a person skilled in the art that the present invention is not limited to the embodiments described in the present specification. The present invention can be implemented with modifications and alterations without departing from the subject matter and scope of the present invention defined by the claims. Therefore, the descriptions in the present specification are for illustrative purposes only, and are not intended to be limiting the present embodiment in any way.

Although an example in which the AR system 1 is configured to include the content server 20, the communication terminal 60, and the communication terminal 70 has been described, the present invention is not limited thereto. Each function of the AR system 1 may be implemented only by the communication terminal.

Each aspect/embodiment described in the present specification may be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broad-band (UMB), IEEE 802.11 (Wi-Fi), IEEE 802.16 (WiMAX), IEEE 802.20, ultra-wide band (UWB), Bluetooth (registered trademark), any other systems using an appropriate system and/or next generation systems extended based on these systems.

The processing procedure, sequence, flowchart, and the like described in the present specification may be performed in a different order so long as no contradiction is incurred. For example, in the present specification, elements of various steps of the method are described in illustrative order, and the described order should not be taken as a specific limitation.

Input or output information and the like may be stored in a predetermined location (for example, a memory) or may be managed using a management table. Input or output information and the like can be overwritten or updated, or information may be added thereto. Output information and the like may be deleted. Input information and the like may be transmitted to another device.

Determination may be made by a value represented by one bit (0 or 1), may be made by a Boolean value (Boolean: true or false), or may be made by comparison of numerical values (e.g., comparison with a predetermined value).

Each aspect/embodiment described in the present specification may be used alone; may be combined to be used; or may be switched in accordance with execution. Furthermore, the notification of predetermined information (e.g., the notification of "being X") is not limited to the notification that is made explicitly; and the notification may be made implicitly (e.g., the notification of the predetermined information is not performed).

Regardless of whether it is referred to as software, firmware, middleware, microcode, hardware description language, or another name, the software should be interpreted broadly so as to imply a command, a command set, a code, a code segment, a program code, a program, a subprogram, a software module, an application, a software application, a software package, a routine, a subroutine, an object, an executable file, an execution thread, a procedure, a function, and the like.

Furthermore, software, a command, and the like may be transmitted and received through a transmission medium. For example, when the software is transmitted from a Web site, a server, or another remote source using wired technology, such as a coaxial cable, an optical fiber cable, a twisted pair, and a digital subscriber line (DSL), and/or wireless technology, such as infrared, radio, and microwave, the wired technology and/or wireless technology is included within the definition of the transmission medium.

Information, signals, and the like described in the present specification may be represented using any of various different techniques. For example, data, instructions, commands, information, signals, bits, symbols, chips, and the like, which may be described in the entire description, may be represented by a voltage, a current, electromagnetic waves, a magnetic field or magnetic particles, an optical field or photons, or any combination thereof.

Also, the terms described in this specification and/or the terms necessary for understanding the present specification may be replaced with terms having the same or similar meaning.

Also, the information, parameters, and the like, which are described in the present specification, may be represented by absolute values, may be represented as relative values from predetermined values, or may be represented by any other corresponding information.

The user terminal may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The terms "determining" and "deciding" used in the present specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least."

Any reference to elements using names, such as "first" and "second," which are used in the present specification, does not generally limit the quantity or order of these elements. These names are used in the specification as a convenient method for distinguishing two or more elements. Accordingly, the reference to the first and second elements does not imply that only the two elements can be adopted here, or does not imply that the first element must precede the second element in any way.

As long as "include," "including," and the variations thereof are used in the present specification and the claims, these terms are intended to be inclusive, similar to the term "comprising." Furthermore, it is intended that the term "or" used in the present specification or the claims is not "exclusive OR."

In the present specification, it is assumed that a plurality of devices are also included unless a single device is clearly indicated by the context or technically.

In the whole of the present disclosure, it is assumed that a plurality of things are included unless it is not cleared from the context that a singular thing is indicated.

REFERENCE SIGNS LIST

1 AR system (content sharing system)
22 Acquisition unit
23 Identification unit
24 First decision unit
25 Second decision unit
26 Sharing unit

The invention claimed is:

1. A content sharing system comprising:
circuitry configured to
    acquire a user state including at least a visual line direction and position information for each of a plurality of users including a first user who is a user of a content sharing source and one or more second users who are users of content sharing candidates;
    identify gazed content which is content at which the first user is gazing on the basis of the acquired user state of the first user;
    decide whether or not to share the gazed content with other users on the basis of at least one of information of the gazed content and the user state of the first user;
    identify a second user having a strong relationship with the first user on the basis of user states of the first user and the one or more second users when the gazed content is shared with the other users and decide on the identified second user as a content sharing destination user; and
    share the gazed content with the content sharing destination user,
wherein the circuitry decides on the second user whose visual field overlaps that of the first user and whose distance from the first user is less than a predetermined threshold value as the content sharing destination user.

2. The content sharing system according to claim 1, wherein the second user is identified as having a strong relationship with the first user based on the second user being in a specific relationship category with the first user and is at least in a same space as the first user.

3. A content sharing system comprising:
circuitry configured to
    acquire a user state including at least a visual line direction and position information for each of a plurality of users including a first user who is a user of a content sharing source and one or more second users who are users of content sharing candidates;
    identify gazed content which is content at which the first user is gazing on the basis of the acquired user state of the first user;
    decide whether or not to share the gazed content with other users on the basis of at least one of information of the gazed content and the user state of the first user;
    identify a second user having a strong relationship with the first user on the basis of user states of the first user and the one or more second users when the gazed content is shared with the other users and decide on the identified second user as a content sharing destination user; and
    share the gazed content with the content sharing destination user,
wherein the circuitry identifies flow lines of the first user and the one or more second users on the basis of a time-series change in position information indicated in the user state and decides on the second user whose flow line matches that of the first user as the content sharing destination user.

4. A content sharing system comprising:
circuitry configured to
    acquire a user state including at least a visual line direction and position information for each of a plurality of users including a first user who is a user of a content sharing source and one or more second users who are users of content sharing candidates;
    identify gazed content which is content at which the first user is gazing on the basis of the acquired user state of the first user;
    decide whether or not to share the gazed content with other users on the basis of at least one of information of the gazed content and the user state of the first user;
    identify a second user having a strong relationship with the first user on the basis of user states of the first user and the one or more second users when the gazed content is shared with the other users and decide on the identified second user as a content sharing destination user; and
    share the gazed content with the content sharing destination user,
wherein the circuitry further decides on the second user as the content sharing destination user when the same second user is located in visual line directions of the content sharing destination user and the first user in a situation in which the gazed content is shared with the content sharing destination user by the circuitry.

* * * * *